US010269509B1

(12) United States Patent
Habib et al.

(10) Patent No.: US 10,269,509 B1
(45) Date of Patent: Apr. 23, 2019

(54) METHODS AND TECHNIQUES FOR PROTECTION OF MICROGRID ENERGY MANAGEMENT SYSTEM WITH DISTRIBUTED STORAGE

(71) Applicants: Hany Fawzy Habib, Miami, FL (US);
Tarek Youssef, Miami, FL (US);
Osama Mohammed, Miami, FL (US)

(72) Inventors: Hany Fawzy Habib, Miami, FL (US);
Tarek Youssef, Miami, FL (US);
Osama Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/981,335

(22) Filed: May 16, 2018

(51) Int. Cl.
*H01H 3/00* (2006.01)
*H01H 3/32* (2006.01)
*H02J 13/00* (2006.01)
*G05F 1/66* (2006.01)
*H02J 3/32* (2006.01)
*H02J 3/38* (2006.01)

(52) U.S. Cl.
CPC ............... *H01H 3/32* (2013.01); *G05F 1/66* (2013.01); *H02J 3/32* (2013.01); *H02J 3/38* (2013.01); *H02J 13/0089* (2013.01); *H01H 2003/323* (2013.01); *H02J 2003/388* (2013.01)

(58) Field of Classification Search
CPC ................. H01H 3/00; H02J 3/00; G05F 1/00
USPC ........................................................ 307/112
See application file for complete search history.

(56) References Cited

U.S. PATENT DOCUMENTS 6,292,717 B1 * 9/2001 Alexander ......... G01R 19/2513
340/6.1
2011/0282507 A1 * 11/2011 Oudalov .................. H04B 3/54
700/292

* cited by examiner

*Primary Examiner* — Rexford N Barnie
*Assistant Examiner* — Joseph N Inge
(74) *Attorney, Agent, or Firm* — Saliwanchik, Lloyd & Eisenschenk

(57) ABSTRACT

A microgrid energy management system can include: a bus providing a power; a transmission line connected to the bus; a relay connected to the transmission line, sensing a microgrid according to a state of the transmission line, adjusting a relay setting, and generating a trip signal representing the relay setting; and a circuit breaker receiving the trip signal. In addition, the microgrid energy management system further includes an energy storage device connected to the bus.

18 Claims, 9 Drawing Sheets

METHODS AND TECHNIQUES FOR PROTECTION OF MICROGRID ENERGY MANAGEMENT SYSTEM WITH DISTRIBUTED STORAGE

BACKGROUND

Microgrids are becoming an increasingly attractive option due to their numerous benefits, such as the ability to operate both in islanded and grid connected modes of operations. However, the integration of converter-interfaced distributed generation in microgrids has raised several issues, such as the fact that fault currents in these systems in islanded mode are much less than those in grid connected microgrids. Therefore, microgrid protection schemes require a fast, reliable, and robust communication system, with backup, to automatically adjust relay settings for the appropriate current levels according to the microgrid's mode of operation. However, the risk of communication link failures and cyber security threats, as well as the high costs involved to avoid them, are the major challenges for the implementation of an economic adaptive protection scheme.

BRIEF SUMMARY

Embodiments of the subject invention provide novel and advantageous microgrid energy management systems that comprise a relay adjusting the setting based on the failure type, and an energy storage device supplying power regarding the failure, thereby providing an adaptive protection scheme for AC microgrids.

In an embodiment, a microgrid energy management system can comprise: a bus providing power; a transmission line connected to the bus; a relay connected to the transmission line, sensing a microgrid according to a state of the transmission line, adjusting a relay setting, and generating a trip signal representing the relay setting; and a circuit breaker receiving the trip signal.

In another embodiment, a microgrid energy management system can comprise: an AC system; a reference current generator providing a first phase reference current, a second phase reference current, and a third phase reference current based on an active power reference component, a reactive power reference component, and a system frequency of the AC system; a current error generator receiving the first phase reference current, the second phase reference current, and the third phase reference current from the reference current generator, and receiving a first phase current, a second phase current, and a third phase current from the AC system, and providing a first phase current error, a second phase current error, and a third phase current error; a hysteresis band current controller receiving the first phase current error, the second phase current error, and the third phase current error; a switching controller connected to the hysteresis band current controller and providing a first switching signal, a second switching signal, and a third switching signal; a bi-directional converter connected between the first phase current, the second phase current, and the third phase current, and an energy storage device, the bi-directional converter being controlled by the first switching signal, the second switching signal, and the third switching signal.

In yet another embodiment, a microgrid energy management system can comprise: a bus providing a power; a transmission line connected to the bus; a relay connected to the transmission line, sensing a microgrid according to a state of the transmission line, adjusting a relay setting, and generating a trip signal representing the relay setting; a circuit breaker receiving the trip signal; an energy storage device connected to the bus; and a converter between the bus and the energy storage device, the relay comprising: a first adder adding a grid current and a microgrid current, and generating a first summation signal; a second adder adding the microgrid current and an energy storage device current, and generating a second summation signal; a first comparator comparing a fault current and the first summation signal, and generating a first comparator signal; a second comparator comparing the fault current and the second summation signal, and generating a second comparator signal; a third comparator comparing the fault current and the microgrid current, and generating a third comparator signal; a first OR gate receiving the first comparator signal and the second comparator signal, and generating a trigger high signal; an AND gate receiving the third comparator signal and a communication signal, and generating a trigger low signal; and a second OR gate receiving the trigger high signal and the trigger low, and generating the trip signal.

DETAILED DESCRIPTION

Figure 1:
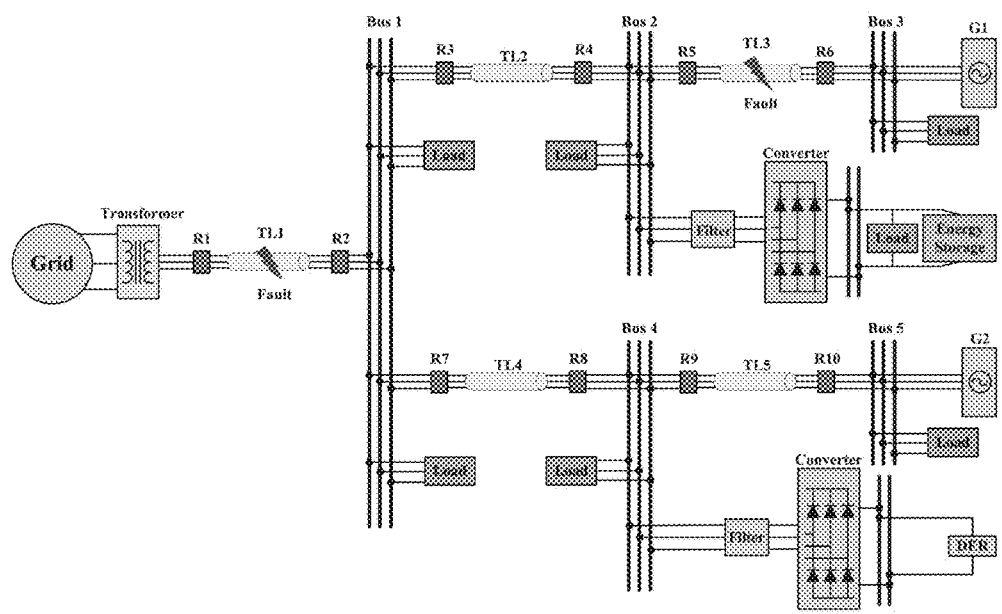
FIG. 1 shows a configuration of a microgrid according to an embodiment of the subject invention.

Embodiments of the subject invention provide novel and advantageous microgrid energy management systems that comprise a relay adjusting the setting based on the failure type, and an energy storage device supplying power regarding the failure, thereby providing an adaptive protection scheme for AC microgrids. Embodiments show an adaptive protection scheme for AC microgrids which is capable of surviving communication failures. The contribution of the protection scheme of embodiments of the subject invention is three folds. The first contribution is the use of an energy storage system as the main contributor to fault currents in the microgrid's islanded mode when the communication link fails to detect the shift to the islanded mode. The second contribution is the design of an autonomous control algorithm for the AC/DC converter capable of operating when the microgrid is in both grid-connected and islanded mode. Utilizing a single mode of operation for the converter will eliminate the reliance on communicated control command signals to shift the controller between different modes. The third contribution is the ability of the overall system to keep stable voltage and frequency levels during extreme cases such as the occurrence of a fault during a peak pulse load period. The results of the protection scheme of embodiments of the subject invention show that the energy storage inverter system is able to contribute enough fault current for a sufficient duration to cause the system protection devices to clear the fault in the event of communication loss. The methods of embodiments of the subject invention were investigated under different fault types and showed excellent results of the protection scheme. In addition, it was demonstrated that, whenever possible, the temporary disconnection of the pulse load during the fault period will allow the utilization of smaller supercapacitors to feed fault currents and thus reduce the overall expenditures.

Embodiments of the subject invention provide adaptive protection schemes for a hybrid AC/DC microgrid capable of surviving communication failures. The main contribution is the use of an energy storage system as the main fault current source in the microgrid islanded mode when the communication link fails.

Embodiments also provide adaptive protection schemes that utilize energy storage to enhance resiliency against communication outages. Embodiments introduce an autonomous control algorithm developed for the energy storage's AC/DC converter. The control of the scheme is capable of deciding upon charging, discharging of the energy storage, and whether or not to feed fault currents in the AC side, based on direct voltage and frequency measurements from its connection point with the microgrid. This eliminates the need for a control command to be sent from the point of common coupling of the microgrid with main grid to adjust the controller's mode of operation and thus reducing the risk of controller failure due to cyber-attacks or other communication issues.

The microgrid can operate in a grid-connected mode, an islanded of operation with communication, or an islanded mode of operation without communication. FIG. 1 shows a configuration of a microgrid according to an embodiment of the subject invention. When a fault occurs in any of the transmission lines within the AC microgrid (such as the fault at transmission line TL3 as shown in FIG. 1), high short-circuit currents are expected to flow in the place of the fault reaching values between 6-7 times of the rated current value. In this case, the relays are adjusted to the Higher Setting, and the microgrid operates in a grid-connected mode.

When the microgrid has been disconnected from the main grid due to a fault at the transmission line TL1 as shown in FIG. 1, the microgrid is thus operating in islanded mode. The relay at the Point of Common Coupling (PCC) senses this shift and issues a control signal to all relays to shift to the lower setting.

The setting of the relays is therefore adjusted to be between 1.2-1.5 times of the rated current at this mode. This is due to the fact that the microgrid cannot feed the fault with the same capacity as the main grid. Reliable communication between the PCC and the relays is critical for shifting between relay settings for proper isolation of the fault. During this case, the settings of the relays will not shift to the proper setting (Lower Setting) and will render them unable of sensing faults. In this event, energy storage devices can be added to solve the problem of communication failure.

Loss of communication in a system is when a system's components that act control commands stop responding to commands or behave in unconventional ways due to a system malfunction or a malicious cyber-attack. In fact, loss of communication may be due to several reasons like failure of communication equipment, such as a network switch, or noise on a communication channel causing transmission errors or data unavailability. Communication might also be lost due to a failure in of central systems (e.g. servers) at substations and microgrids control centers causing unreliable sending and reception of control signals. Last but not least, loss of communication might be due to malicious efforts such as cyber-attacks. A denial of service (DOS) attack is when the attacker attempts to prevent authorized users or machines from accessing a service. One way of doing this is to disrupt or exploit the services of the relay.

In adaptive protection operations, a DoS attack might disrupt the operation of intelligent electronic devices (IEDs) by transmitting malicious code to the targeted IED or IEDs that writes over-sized data to cause a buffer overflow. The attacker can choose to exploit common services on a relay. This can be done by opening multiple sessions on either the File Transfer Protocol (FTP), or Telnet services, and keeping them idle all the time, thereby preventing the relay from responding to critical grid events such as protection. DoS could be the result of a flooding attack to delay message delivery past the critical flooding rate by congesting the channel and exhausting the computation resources of the communicating nodes.

When the communication fails in the islanded mode of operation, the setting of the relay is not adjusted to the lower setting and the relay is adjusted to trip at higher setting. The capability of the islanded microgrid is not enough to reach to this setting. The energy storage device is used to solve this problem. This device can compensate for the difference between the grid and islanded mode and will contribute to the fault current raising it to a value which is sensed by the high relay setting detect and isolate the fault. Therefore, the protection methods of embodiments of the subject invention will be able to survive communication failures as it will be explained below.

Figure 2:
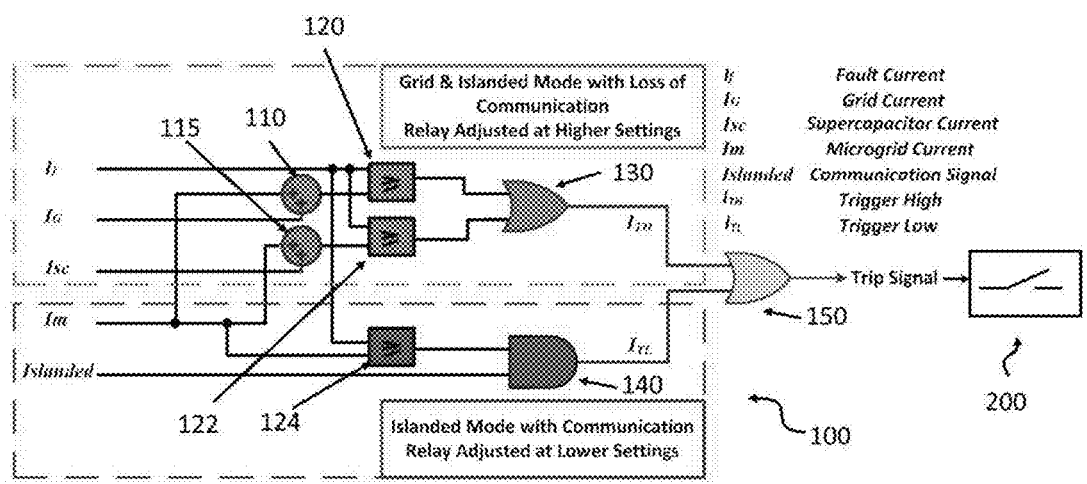
FIG. 2 shows a logic circuit of a relay and a circuit breaker according to an embodiment of the subject invention.

FIG. 2 shows a logic circuit of a relay and a circuit breaker according to an embodiment of the subject invention. Referring to FIG. 2, a relay 100 can operate during the different modes of operation under namely grid connected mode, islanded mode with communication, and islanded mode with loss of communication. The logic embedded into the relays in order to sense several of types of faults contains two settings of operation one corresponding to the higher setting and another corresponding to the lower setting. The higher setting operates at grid and islanded mode with loss of communication, while the lower setting is activated during the islanded mode with communication. Shifting between these two settings occurs as a result of a command signal coming from the point of common coupling (PCC) of the microgrid with the main grid through communication link which is referred to as "Islanded" in FIG. 2. In the Higher Setting, the relay 100 is configured to trip a circuit breaker 200 at a high group of measured currents, whereas in the Lower Setting the relay 100 is configured to trip the circuit breaker 200 at a lower group of input currents.

Referring still to FIG. 2, the relay 100 comprises two adders, three comparators, two OR gates, and one AND gate. A first adder 110 adds a grid current $I_G$ and a microgrid current $I_m$, and then generates a first summation signal. A second adder 115 adds the microgrid current $I_m$ and an energy storage device current $I_{ESD}$ (i.e., supercapacitor current $I_{SC}$), and then generates a second summation signal. A first comparator 120 compares a fault current $I_f$ and the first summation signal, and then generates a first comparator signal. A second comparator 122 compares the fault current $I_f$ and the second summation signal, and then generates a second comparator signal. A third comparator 124 compares the fault current $I_f$ and the microgrid current $I_m$, and then generates a third comparator signal. A first OR gate 130 receives the first comparator signal and the second comparator signal, and then generates a trigger high signal $I_{TH}$. An AND gate 140 receives the third comparator signal and a communication signal Islanded, and then generates a trigger low signal $I_{TL}$. A second OR gate 150 receives the trigger high signal and the trigger low, and generates the trip signal that are configured to be transferred to the circuit breaker 200.

The mathematical equations that can describe the protection techniques of embodiments of the subject invention are explained below. Equation (1) gives the operation of the logic circuit of the relay 100 at trigger high ($I_{TH}$) that represented higher settings, when the system operates at grid connected or at islanded mode when the communication fails $$I_{TH} = \begin{cases} 1 & \{I_f \geq I_G + I_m\} + (I_f \geq I_{ESD} + I_m) \\ 0 & \text{otherwise} \end{cases} \quad (1)$$

Equation (2) describes the logic of the relay 100 at islanded mode of operation when the communication is available in the system. In this case, the relay will produce ($I_{TL}$) and adjusted at lower settings.

$$I_{TL} = \begin{cases} 1 & (I_f \geq I_m) \cdot \text{Islanded} \\ 0 & \text{otherwise} \end{cases} \quad (2)$$

The relay 100 will send the trip signal to the circuit breaker 200 whether ($I_{TH}$) or ($I_{TL}$) achieved as indicated in equation (3):

$$\text{Trip signal} = I_{TH} + I_{TL} \quad (3)$$

Figure 3:
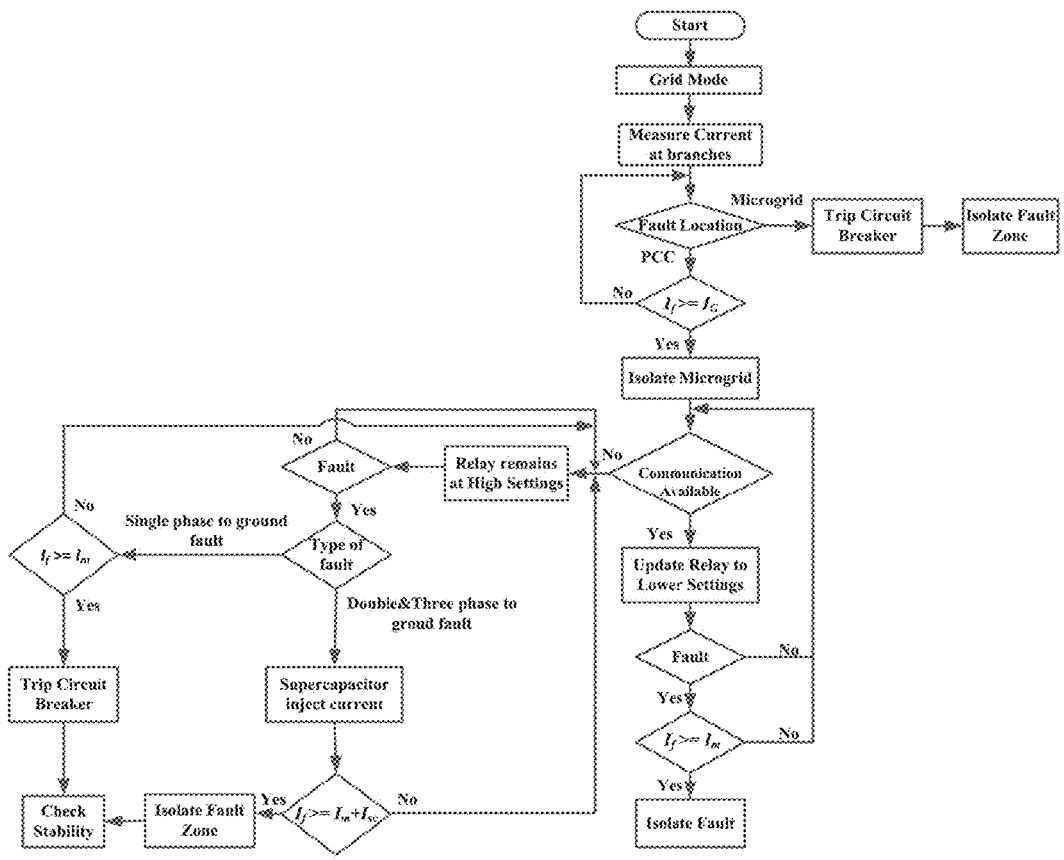
FIG. 3 shows a flowchart of a protection scheme according to an embodiment of the subject invention.

FIG. 3 shows a flowchart of a protection scheme according to an embodiment of the subject invention. At grid connected mode, the current at each terminal of the transmission lines is measured. When the fault takes place at the microgrid, the fault can be cleared whether the relay settings are adjusted at high or low settings since the fault will be fed mainly from grid. Referring to FIGS. 1-3, if the fault occurred at the point of common coupling (PCC) with microgrid, the relay 100 will send the trip signal to the circuit breaker 200 when ($I_f \geq I_G + I_M$) and isolate the fault zone. After that, the mode of operation changes to be islanded and the communication plays an important role to determine the relay settings level. When the communication is available, the relay 100 can update its settings to lower settings and at fault clearing condition ($I_F \geq I_M$) the circuit breaker 200 isolates the faulted part from the system.

When the communication is lost, due to a cyber-attack for example, the relay remains at high settings and the previous condition is not satisfied. For this case and when the fault occurs, according to the type of fault, the current can be fed and the relay reaches to the setting value. If the applied fault was single line to ground fault, the microgrid can contribute to the fault current and the faulted zone is detected and isolated from the system. In order to detect three or double phase to ground fault, the energy storage device can compensate the required current to the relay and isolate the fault. Whether the energy device's state is charging or discharging, it can feed the relay with the current and trip circuit breaker when ($I_F \geq I_G + I_{ESD}$). The stability of the overall system is checked to ensure that the frequency and voltages at AC and DC sides are stable especially when the fault happened and pulsed load is turned on.

Figure 4:
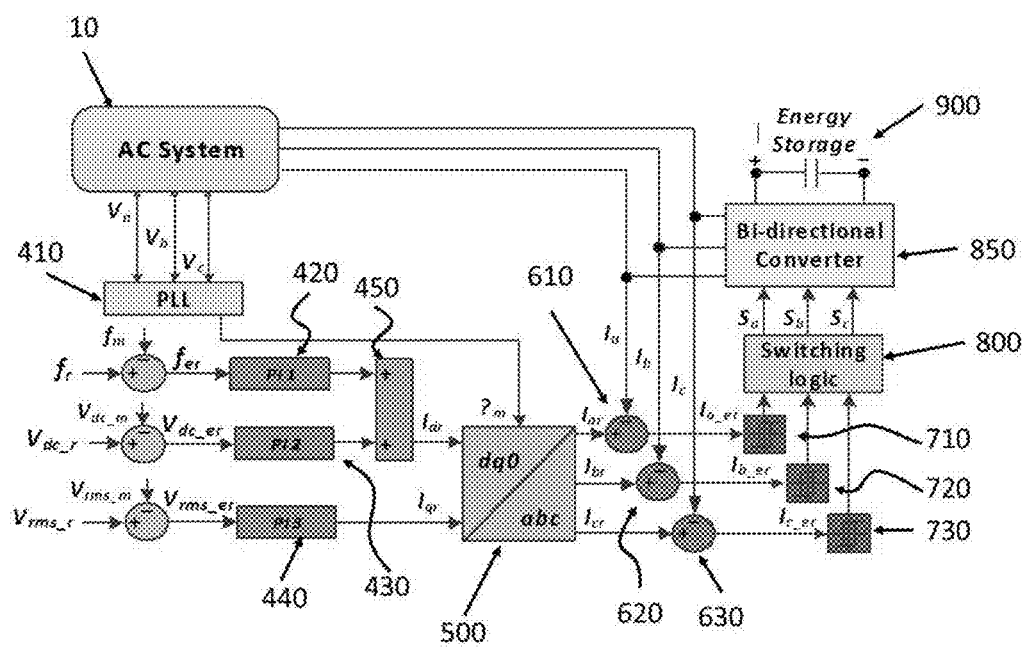
FIG. 4 shows an autonomous control of energy storage device according to an embodiment of the subject invention.

FIG. 4 shows an autonomous control of energy storage device according to an embodiment of the subject invention. The energy storage device is typically designed to supply a periodic pulse load in a system. This device is coupled with the AC side through a bidirectional AC-DC voltage source converter (VSC) as indicated in FIG. 4. An improved control method with only one mode of operation has been shown in this embodiment to allow the microgrid to work properly during the normal and faulty operations whether in grid-connected on islanded mode of operation. Thus the controller needs not to rely on any communication signal to detect the mode of operation of the microgrid as it is autonomous in nature. In the normal operation, the energy storage device will charge from the AC side during the off-time pulse load, and then discharge during the on-time pulse load to supply the load demand. Moreover, the controller is designed to allow the DC microgrid to regulate the AC side frequency and voltage during the islanded mode of operation.

During the faulty operation, the controller will direct the microgrid to enhance the system stability and will help the system restore after isolating the fault. This is the controller's role if either the system has enough resources to supply the fault current such as grid-connected operation, or the protection relays were able to update their settings based on data communication.

In case the system does not have enough resources and the communication was unavailable, the controller will force the microgrid to compensate the fault current and achieve fault isolation. This function will enhance the protection system resiliency against communication failures.

Referring to FIG. 4, the microgrid energy management system comprises an AC system 10, a reference current generator 500, a current error generator, a hysteresis band current controller, a switching controller 800, a bi-directional converter 850, and an energy storage device 900.

The reference current generator 500 provides a first phase reference current $I_{ar}$, a second phase reference current $I_{br}$, and a third phase reference current $I_{cr}$ based on an active power reference component, a reactive power reference component, and a system frequency of the AC system 10.

The current error generator comprises a first current error generator 610 receiving the first phase reference current $I_{ar}$ and a first phase current $I_a$, a second current error generator 620 receiving the second phase reference current $I_{br}$ and a second phase current $I_b$, and a second current error generator 630 receiving the third phase reference current $I_{cr}$ and a third phase current $I_c$. The first current error generator 610, the second current error generator 620, and the third current error generator 630 provides a first phase current error $I_{a\_er}$, a second phase current error $I_{b\_er}$, and a third phase current error $I_{c\_er}$, respectively.

The hysteresis band current controller comprises a first hysteresis band current controller 710 receiving the first phase current error $I_{a\_er}$, a second hysteresis band current controller 720 receiving the second phase current error $I_{b\_er}$, and a third hysteresis band current controller 730 receiving the third phase current error $I_{c\_er}$.

The switching controller 800 is connected to the connected to the first to third hysteresis band current controllers 710-730 and generates a first switching signal $S_a$, a second switching signal $S_b$, and a third switching signal $S_c$.

The bi-directional converter 850 is connected to the first phase current $I_a$, the second phase current $I_b$, and the third phase current $I_c$, and the energy storage device 900 such that the first to third phase currents charge the energy storage device 900 or the energy storage device 900 discharges into the first to third phase currents. The bi-directional converter 850 is controlled by the first switching signal $S_a$, the second switching signal $S_b$, and the third switching signal $S_c$.

Referring to FIG. 4, two control loops are implemented for active and reactive power flow control to achieve both frequency and voltage regulation. The storage device reactive power is controlled, based on $I_{qr}$, to keep the AC side voltage ($V_{rms\_r}$) at a specified value using a third proportional integral (PI) controller 440. The active power reference component $I_{dr}$ is generated by an active power controller 450 by using two PI controllers including a first PI controller 420 and a second PI controller 430. The first is responsible for regulating the AC side frequency ($f_r$) to be within the acceptable limit, whereas the second is used to keep the energy storage device DC voltage ($V_{dc\_r}$) within the specified level. Using the AC side frequency as a signature to the active power flow allows the supercapacitor to supply large currents during the fault and contribute to the fault current during loss of communication situations.

The reference current generator 500 generates three reference phase currents ($I_{ar}$, $I_{br}$ and $I_{cr}$) based on the inverse Park transformation from the dq0 rotating reference frame currents. The angle between the two reference frames and the system frequency are estimated from three-phase Phase Locked Loop block (PLL) 410 receiving a first phase voltage $V_a$, a second phase voltage $V_b$, and a third phase voltage $V_c$ from the AC system 10. The abc reference currents are compared with the actual measured currents and applied to the pulse width modulation (PWM) scheme to generate the switching signals of the bi-directional converter 850 (i.e., inverter). The PWM scheme is performed by the first to third hysteresis band current controllers 710-730 and the switching controller 800. The hysteresis band current control is considered in this work because of its simplicity of implementation and fast response current loop.

Figure 5:
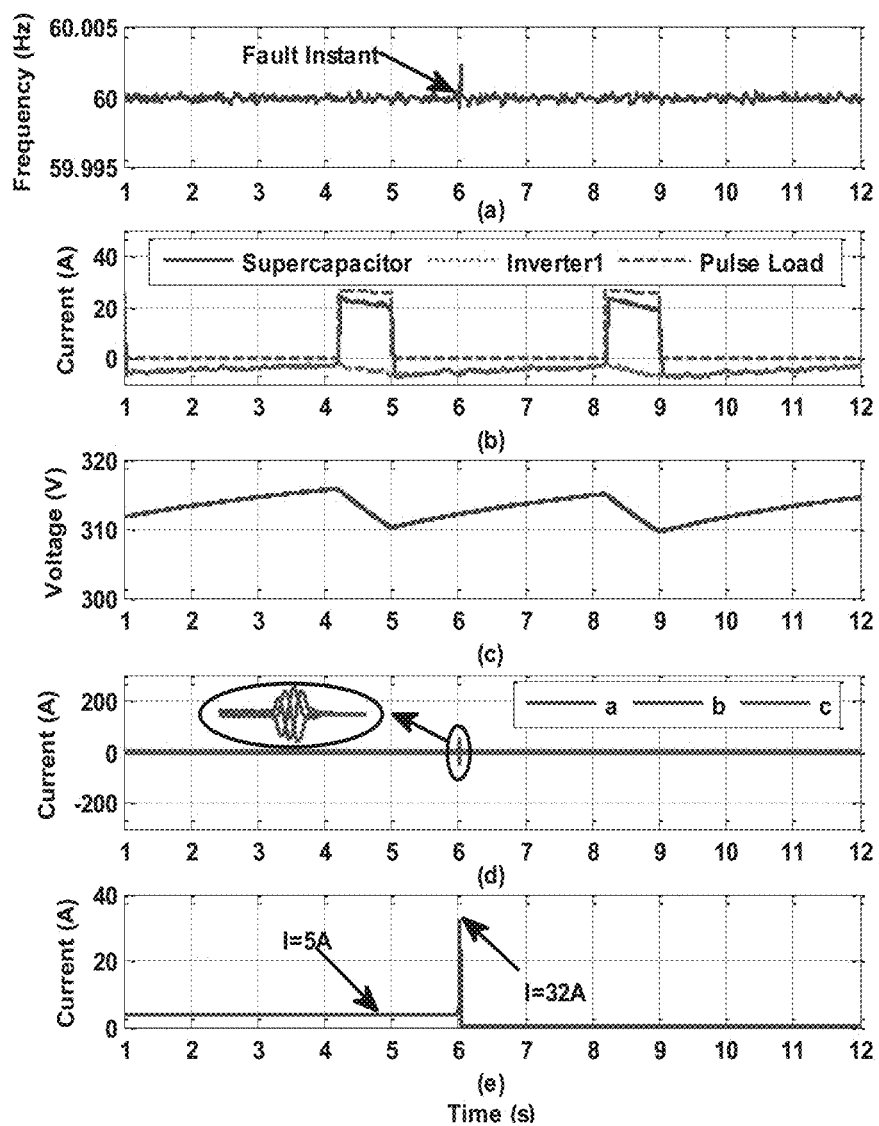
FIG. 5 shows a system performance during fault at grid connected mode of operation: (a) frequency, (b) supercapacitor current, inverter current, and pulse load current, (c) supercapacitor DC voltage (d) three-phase currents in the faulted transmission line, and (e) RMS current in the faulted transmission line.

FIG. 5 shows a system performance during fault at grid connected mode of operation. In the case a three-phase to ground fault (at transmission line TL3 in FIG. 1), the microgrid was in grid connected mode of operation. As it can be noticed in FIG. 5, the fault occurred at t=6 seconds and cleared instantaneously. In this case, the utility helped to maintain the system's frequency stable during and after the fault, as shown in FIG. 5(a). FIG. 5(b) shows the pulse load ($I_{pl}$), and the energy storage current which can be represented as supercapacitor ($I_c$), and inverter ($I_{inv1}$) currents. During the off-time pulse load, the supercapacitor will be charging from the AC side, whereas during the on-time pulse load the supercapacitor will be the major feeder to the pulse load, as indicated in FIG. 5(c). The AC side will still be present to feed the pulse load in case the supercapacitor went out of service. FIGS. 5(d) and (e) show the high fault current values of 32 Amps which is mainly being contributed to by the grid. As anticipated for the grid connected mode, the fault current is almost more than 6 times the rated AC current and thus the protection devices where able to detect and isolate the faults successfully.

Figure 6:
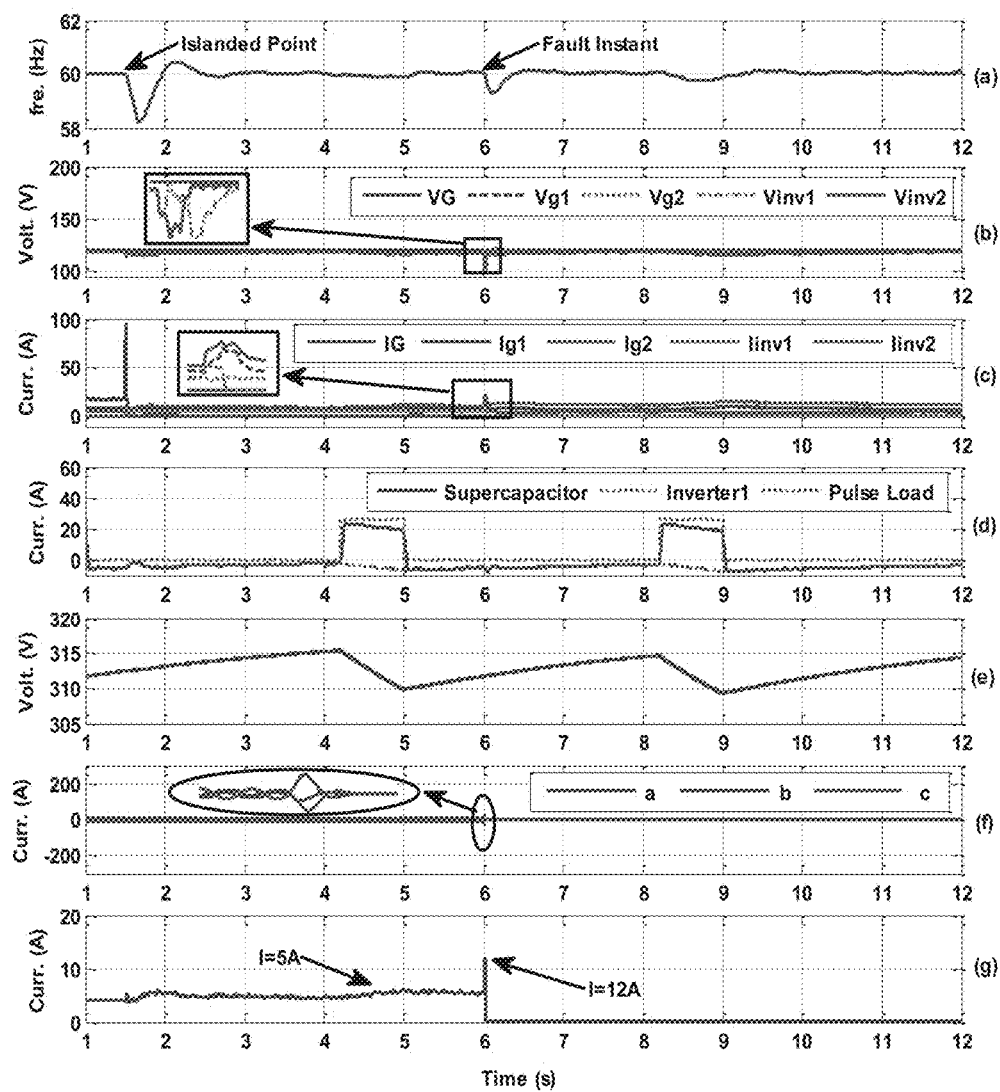
FIG. 6 shows a system performance during fault at microgrid operation with communication: (a) frequency; (b) output voltage of each source; (c) output current of each source; (d) supercapacitor current, inverter1 current, and pulse load current; (e) supercapacitor DC voltage; (f) three-phase current in the faulted transmission line; and (g) RMS current in the faulted transmission line.

FIG. 6 shows a system performance during fault at microgrid operation with communication. In this situation of FIG. 6, a three-phase-to-ground fault (at transmission line TL in FIG. 1) occurred at time t=1.5 seconds, in the transmission line connecting the main grid to the microgrid. As a result, relay ($R_1$) will send a trip signal to circuit breaker ($CB_1$) to isolate the microgrid. The microgrid successfully shifted to a stable islanded mode by adjusting its overall frequency back to the normal condition after fault, as shown in FIG. 6(a). A small disturbance, within acceptable limits, in the output voltages of the sources ($V_G$, $V_{g1}$ $V_{g2}$, $V_{inv1}$ and $V_{inv2}$ representing the voltages at busses 1, 3, 5, 2 and 4, respectively), is noticed in FIG. 6(b). FIG. 6(c) shows a spike in $I_G$ due to the fault and this current drops to zero after clearing the fault by disconnecting the microgrid.

An increase in the generator's currents ($I_{g1}$ and $I_{g2}$) is noticed in order to compensate for the current which was previously supplied mainly by the grid. FIGS. 6(d) and (e) show the supercapacitor-pulse load microgrid performance parameters which exhibit stable performance during the islanding instant. Finally, FIGS. 6(f) and (g) indicate the minor change in the AC current at transmission line connecting busses 2 and 3 after the fault. During the islanded operation, another three-phase-to-ground fault occurred at t=6 seconds, in the middle of transmission line connecting buses 2 and 3. Based on the available communication infrastructure in the system, relay $R_5$ settings is adjusted to the lower setting and thus was capable of detecting the fault and tripping $CB_5$ accordingly. FIG. 6(a) shows the microgrid frequency recovery after the fault incident. As can be noticed the system is showing stable performance during and after the fault with disturbances within the specified limits of microgrids operation. The sources voltages $V_{G2}$, $V_{inv1}$ and $V_{inv2}$ dropped at the fault incident and recovered after clearing the fault, as shown in FIG. 6(b). After the fault was cleared, FIG. 6(c) shows that $I_{g1}$ dropped to zero since generator $G_1$ was isolated from the system. Current $I_{g2}$ increased to feed the loads accordingly. It can be noticed in FIGS. 6(d) and (e) that the supercapacitor was not used to feed the fault current due to the adaptation process for $R_5$ setting to its lower setting. FIGS. 6(f) and (g) show that the AC current in transmission line 3 increased significantly from 5 to 12 A during the fault instance. It can be noticed also, that the fault current level is less than that appeared in the grid connected mode (32 A) as was discussed earlier.

Figure 7:
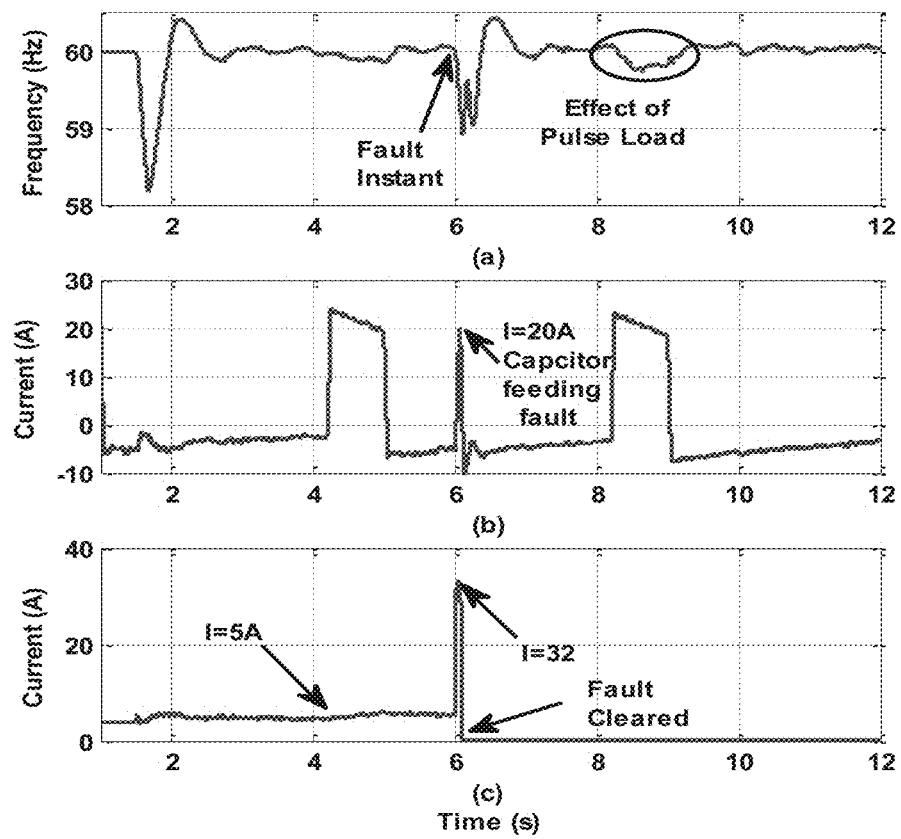
FIG. 7 shows a system performance during fault at microgrid operation without communication: (a) frequency; (b) supercapacitor current; and (c) RMS current in the faulted transmission line.

FIG. 7 shows a system performance during fault at microgrid operation without communication. In this case, fault at $TL_3$ occurred during the off-time of the pulse load (i.e. charging of the supercapacitor). Due to the assumption of the communication failure, relay $R_5$ will not be able to switch to the lower settings. In this case, as shown in FIG. 7(b), the supercapacitor compensate the fault current until it reach to the higher setting of the relay (32 A) as indicated in FIG. 7(c). This resulted in relay $R_5$ sensing the fault and thus isolating it accordingly. After clearing the faulted region the system restored and shows stable performance.

A greater understanding of the present invention and of its many advantages may be had from the following example, given by way of illustration. The following example is illustrative of some of the methods, applications, embodiments, and variants of the present invention. It is, of course, not to be considered as limiting the invention. Numerous changes and modifications can be made with respect to the invention.

Example 1

Figure 8:
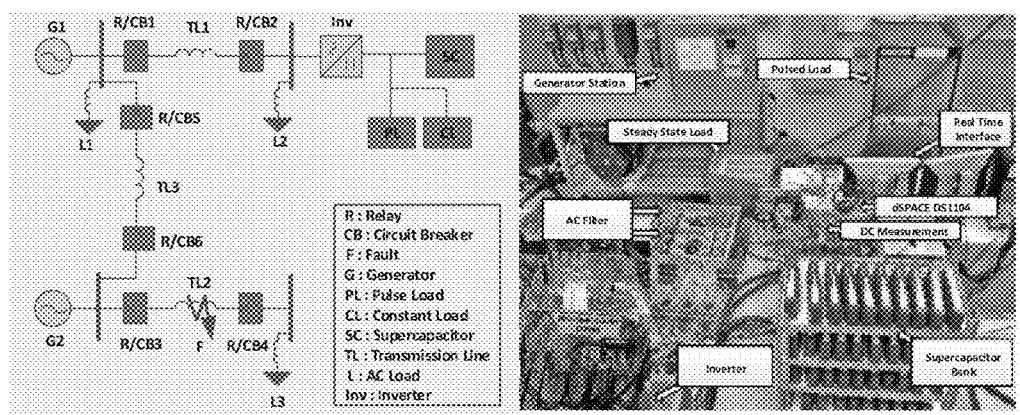
FIG. 8 shows a test setup for a microgrid energy management system according to an embodiment of the subject invention.

FIG. 8 shows a test setup for a microgrid energy management system according to an embodiment of the subject invention. This example presents experimental verification where the most challenging mode of operation during islanded mode is selected in conjunction with feeding both a fault and pulsed load demand at the same instant, and there won't be enough resources to feed them. This represents a worst case scenario, where a single ESD device is dispatched to fill he required demand. The case study assumed a communication failure between the relays. Thus, the relays settings are always adjusted to the high setting.

To illustrate the capability of the proposed algorithm, an experimental study has been performed in a microgrid setup at the Florida International University (FIU) Smart Grid testbed as shown in FIG. 8. The basic structure of the hybrid AC/DC microgrid consists of two generators that supply loads with different characteristics on the AC side as shown in Table I.

TABLE I

SYSTEM COMPONENT PARAMETERS

| Component | Parameter | Specification |
|---|---|---|
| Supercapacitor bank | Number of cells | 20 |
| | Rated voltage | 320 |
| | Rated capacity | 2.9 F |
| | Surge voltage | 340 |
| | Leakage current | 5.2 mA |
| G1, G2 | Apparent Power | 13.8, 10 KVA |
| | Nominal Voltage | 208, 208 V |
| | Stator Leakage Reactance (XL) | 0.09 0.09 pu |
| | d-axis Synchronous Reactance (Xd) | 2.21, 2.248 pu |
| | q-axis Synchronous Reactance (Xq) | 1.1, 1.117 pu |
| | d-axis Transient Time Constant (Td') | 0.014, 0.012 s |
| Transmission Line | $r_1$, | 0.0015 Ω/Km, |
| | $r_0$ | 0.03 Ω/Km |
| | $l_1$, | 0.03 mH/Km, |
| | $l_0$ | 0.1 mH/Km |
| | $c_1$, | 3 nF/Km, |
| | $c_0$ | 2 nF/Km |
| Filter | $L_{AF}$ | 12 mH |
| Fault Resistance | $R_f$ | 18 Ω |
| Loads 1,2 | $L_1 L_2$ | 300 Ω, 900 Ω |
| Pulse Load | PL | 1.66 kW |
| Constant Load | CL | 550 W |
| Inverter | $R_s$ | 1e5 Ω |
| | $R_{on}$ | 1e-3 Ω |
| | Switching frequency | 5 KHz |

Figure 9:
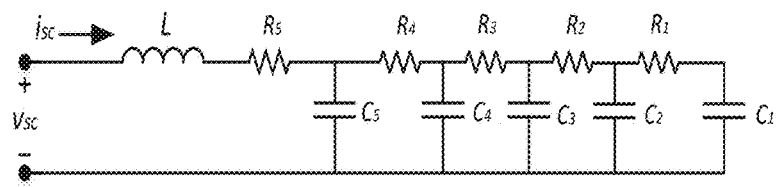
FIG. 9 shows a six-order equivalent circuit model for a supercapacitor according to an embodiment of the subject invention.

Supercapacitor (SC) bank was implemented to supply a pulsed and steady state load. FIG. 9 shows the sixth-order model of the supercapacitor bank employed in our virtual test bed. The detailed model parameters of the supercapacitor implemented in our virtual test bed can be found in Table II. The SC bank contributes to the fault current, while there are not enough resources to feed it, which is in the case of islanded mode of operation. This SC bank is composed of 20 Maxwell 16-V modules based upon 350-F cells. In addition, analog hysteresis protection is designed to ensure that uneven charge distribution, particularly during very fast charges, does not cause the SC to exceed its maximum voltage limit. In the studied DC microgrid, the SC bank was initially at full charge and serves to maintain the bus voltage within the accepted limits (±5% of the rated voltage).

TABLE II

SIX-ORDER MODEL PARAMETERS OF THE 2.9-F SUPERCAPACITOR BANK

| | | | |
|---|---|---|---|
| $R_1$ | 1.02069 Ω | $C_1$ | 0.9193 F |
| $R_2$ | 0.17034 Ω | $C_2$ | 1.5428 F |
| $R_3$ | 0.05069 Ω | $C_3$ | 0.5481 F |
| $R_4$ | 0.05862 Ω | $C_4$ | 0.0594 F |
| $R_5$ | 0.22828 Ω | $C_5$ | 0.0008 F |
| L | 2.2413e-3 mH | | |

For dynamic operation and a fault study, the detailed model of the microgrid shown in FIG. 8 is implemented in our virtual testbed platform using the MATLAB/Simulink software and executed with the dSPACE 1104 real-time interface to control and adjust the pulsed and steady-state loads.

Figure 10:
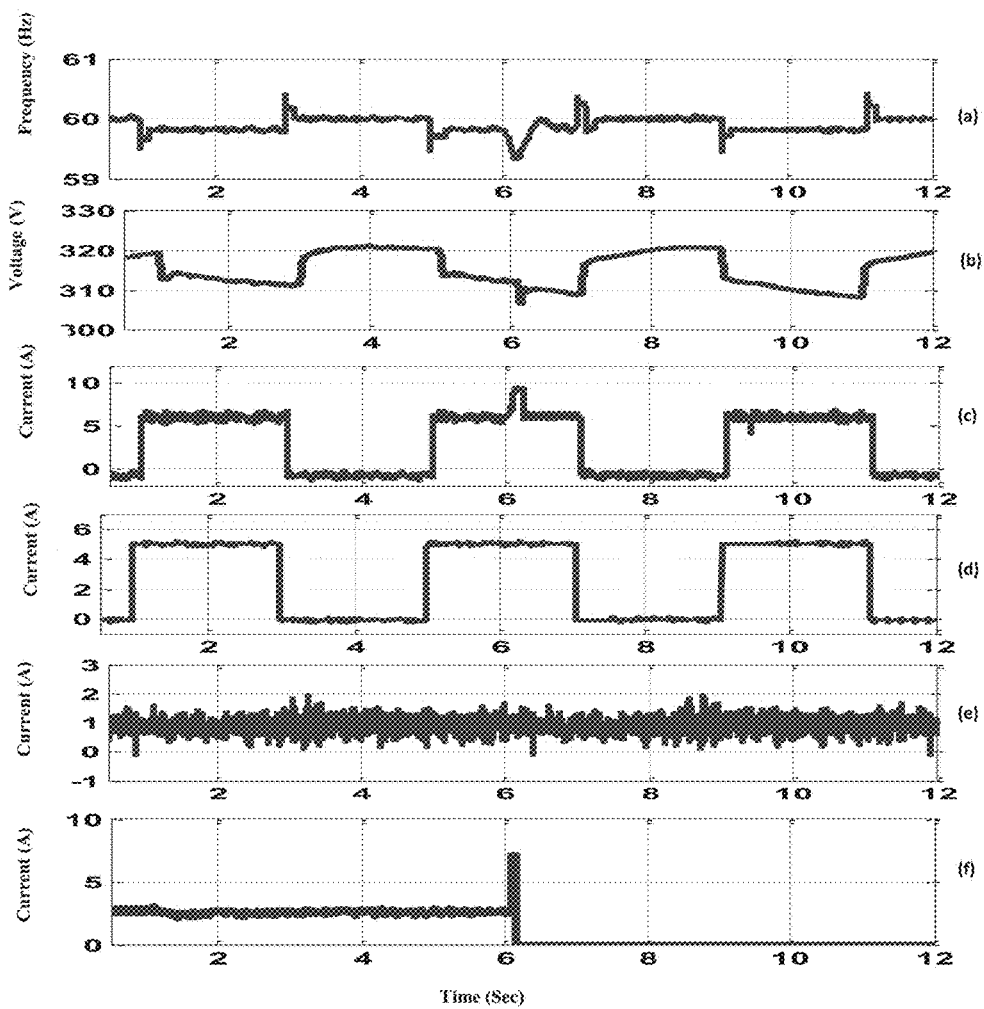
FIG. 10 shows test results during fault at islanded mode of operation: (a) frequency; (b) supercapacitor DC voltage; (c) supercapacitor current; (d) pulse load current; (e) steady state load current; and (f) RMS current in the faulted transmission line 2.

FIG. 10 shows test results during fault at islanded mode of operation. To validate the protection schemes of embodiments of the subject invention, the performance of the microgrid under study was operated in islanded mode as shown in FIG. 10. It can be seen that the SC was discharged between t=0.94 sec and t=2.97 sec, and the frequency and DC voltage changed to 59.81 Hz and 311 V as shown in FIGS. 10(*a*) and (*b*), respectively. The system frequency was stable at 60 Hz and the DC voltage at 320 V, respectively, during the period of t=2.98 sec and t=5.05 sec when the SC was charging. A 3Ø-to-ground fault (F) scenario was realistically demonstrated. The fault was created by applying an 18Ω high fault impedance at t=6 sec. The frequency dropped to 59.32 Hz, while the current of the SC increased from 5.21 A to 9.86 A, indicating the fault current contribution from the SC was 4.65 A as shown in FIG. 10(*c*). It can be shown from FIGS. 10(*d*) and (*e*) that the pulsed and steady state load currents remained stable throughout the experiment. The authors assume that the high current setting of the relay was adjusted to be only three times the rated current (2.4 A) during the islanded mode of operation when the SC contributed to the fault current. It should be noted that the current values in the hardware experimentation were scaled down in order to test within safe experimental limits in a laboratory environment. FIG. 10(*f*) shows that the total current at $TL_2$ for this case increased, reaching 7.2 A and tripped by $CB_3$ to isolate the fault from the system. In addition, it can be found that the system parameters (frequency, AC voltage and DC voltage) maintained stable over the experiment. The frequency maintained within acceptable limits (59.7 and 60.2 Hz) and DC voltage only fluctuated between 311 V and 320 V that is less than 5% of the rated value.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A microgrid energy management system, comprising:
a bus providing a power;
a transmission line connected to the bus;

a relay connected to the transmission line, sensing a microgrid according to a state of the transmission line, adjusting a relay setting, and generating a trip signal representing the relay setting;

a circuit breaker receiving the trip signal; and an energy storage device connected to the bus, the relay comprising:
- a first adder adding a grid current and a microgrid current, and generating a first summation signal;
- a second adder adding the microgrid current and an energy storage device current, and generating a second summation signal;
- a first comparator comparing a fault current and the first summation signal, and generating a first comparator signal;
- a second comparator comparing the fault current and the second summation signal, and generating a second comparator signal;
- a third comparator comparing the fault current and the microgrid current, and generating a third comparator signal;
- a first OR gate receiving the first comparator signal and the second comparator signal, and generating a trigger high signal;
- an AND gate receiving the third comparator signal and a communication signal, and generating a trigger low signal; and
- a second OR gate receiving the trigger high signal and the trigger low, and generating the trip signal.

2. The microgrid energy management system according to claim 1, the relay setting being adjusted into a first setting at a grid connected mode and an islanded mode with loss of communication and the relay setting being adjusted into a second setting at an islanded mode with communication, the grid connected mode representing a case where a fault of the transmission is occurred in the microgrid, and the microgrid is connected to the grid, the islanded mode with loss of communication representing a case where the microgrid is disconnected from the grid, and a communication of the microgrid is not available, and the islanded mode with communication representing a case where the microgrid is disconnected from the grid, and a communication of the microgrid is available.

3. The microgrid energy management system according to claim 2, the first setting being determined by the trigger high signal, and the second setting being determined by the trigger low signal.

4. The microgrid energy management system according to claim 2, the trigger high signal being set as a logic high based on the fault current, the logic high of the trigger high signal representing that the fault current is equal to or larger than the first summation signal, that the fault current is equal to or larger than the second summation signal, or that the fault current is equal to or larger than the first summation signal and the fault current is equal to or larger than the second summation signal.

5. The microgrid energy management system according to claim 4, the circuit breaker isolating a fault zone.

6. The microgrid energy management system according to claim 2, the trigger low signal being set as a logic high based on the fault current, the logic high of the trigger low signal representing that the fault current is equal to or larger than the microgrid current.

7. The microgrid energy management system according to claim 6, the communication signal being set as a logic high, the logic high of the communication signal representing a case where the communication of the microgrid is not available.

8. The microgrid energy management system according to claim 7, the circuit breaker isolating a fault zone.

9. The microgrid energy management system according to claim 2, the energy storage device being configured to provide a required current to the relay.

10. A microgrid energy management system, comprising:
- an AC system;
- a reference current generator providing a first phase reference current, a second phase reference current, and a third phase reference current based on an active power reference component, a reactive power reference component, and a system frequency of the AC system;
- an current error generator receiving the first phase reference current, the second phase reference current, and the third phase reference current from the reference current generator, and receiving a first phase current, a second phase current, and a third phase current from the AC system, and providing a first phase current error, a second phase current error, and a third phase current error;
- a hysteresis band current controller receiving the first phase current error, the second phase current error, and the third phase current error;
- a switching controller connected to the hysteresis band current controller and providing a first switching signal, a second switching signal, and a third switching signal;
- a bi-directional converter connected between the first phase current, the second phase current, and the third phase current, and an energy storage device,
- the bi-directional converter being controlled by the first switching signal, the second switching signal, and the third switching signal.

11. The microgrid energy management system according to claim 10, the energy storage device charging from the AC system during an off-time pulse load through the bi-directional converter, and the energy storage device discharging during an on-time pulse load through the bi-directional converter.

12. The microgrid energy management system according to claim 11, further comprising a three-phase Phase Locked Loop (PLL) generating the system frequency, the PLL receiving a first phase voltage, a second phase voltage, and a third phase voltage from the system frequency.

13. The microgrid energy management system according to claim 12, further comprising:
- a first proportional integral (PI) controller monitoring a frequency of the AC system;
- a second PI controller monitoring a DC voltage of the energy storage device; and
- an active power controller generating the active power reference component based on the first PI controller and the second PI controller.

14. The microgrid energy management system according to claim 13, further comprising a third PI controller monitoring a voltage of the AC system and generating the reactive power reference component.

15. The microgrid energy management system according to claim 14, the reference current generator performing dq0 to abc transformation based on inverse Park transformation.

16. The microgrid energy management system according to claim 15, the hysteresis band current controller performing Pulse Width Modulation (PWM) based on the first phase current error, the second phase current error, and the third phase current error.

17. The microgrid energy management system according to claim 16, the energy storage device being a supercapacitor.

18. A microgrid energy management system, comprising:
a bus providing a power;
a transmission line connected to the bus;
a relay connected to the transmission line, sensing a microgrid according to a state of the transmission line, adjusting a relay setting, and generating a trip signal representing the relay setting;
a circuit breaker receiving the trip signal;
an energy storage device connected to the bus; and
a converter between the bus and the energy storage device,
the relay comprising:
  a first adder adding a grid current and a microgrid current, and generating a first summation signal;
  a second adder adding the microgrid current and an energy storage device current, and generating a second summation signal;
  a first comparator comparing a fault current and the first summation signal, and generating a first comparator signal;
  a second comparator comparing the fault current and the second summation signal, and generating a second comparator signal;
  a third comparator comparing the fault current and the microgrid current, and generating a third comparator signal;
  a first OR gate receiving the first comparator signal and the second comparator signal, and generating a trigger high signal;
  an AND gate receiving the third comparator signal and a communication signal, and generating a trigger low signal; and
  a second OR gate receiving the trigger high signal and the trigger low, and generating the trip signal.

* * * * *